US010296954B1

(12) United States Patent
Mishra

(10) Patent No.: US 10,296,954 B1
(45) Date of Patent: May 21, 2019

(54) VIRTUALIZED PRODUCT EVALUATION AND COMPARISON

(71) Applicant: Amazon Technologies, Inc., Seattle, WA (US)

(72) Inventor: Pushpendra Narain Mishra, Pani Ki Tanki (IN)

(73) Assignee: Amazon Technologies, Inc., Seattle, WA (US)

( * ) Notice: Subject to any disclaimer, the term of this patent is extended or adjusted under 35 U.S.C. 154(b) by 661 days.

(21) Appl. No.: 14/660,322

(22) Filed: Mar. 17, 2015

(51) Int. Cl.
*G06Q 30/06* (2012.01)

(52) U.S. Cl.
CPC ..... *G06Q 30/0621* (2013.01); *G06Q 30/0641* (2013.01)

(58) Field of Classification Search
CPC ............. G06Q 30/0621; G06Q 30/0641
USPC .................................. 705/26–27
See application file for complete search history.

(56) References Cited

U.S. PATENT DOCUMENTS

| 2003/0149628 | A1* | 8/2003 | Abbosh | ........ G06Q 20/20 705/16 |
| 2012/0271732 | A1* | 10/2012 | Glass | ........ G06Q 30/0621 705/26.5 |

OTHER PUBLICATIONS

Voss, C.A. 2003, "Rethinking paradigms of service: Service in a virtual environment", International Journal of Operations & Production Management, vol. 23, No. 1, pp. 88-104. (Year: 2003).*

* cited by examiner

*Primary Examiner* — Michael Misiaszek
*Assistant Examiner* — Latasha D Ramphal
(74) *Attorney, Agent, or Firm* — Kilpatrick Townsend & Stockton LLP

(57) ABSTRACT

The performance of functional items, such as headphones, cameras, etc., can be simulated in the context of a network-accessible electronic catalog by using virtual machines, and similar techniques. An electronic marketplace may provide a user with the option to sample the performance of an item being browsed, and can generate and/or configure one or more virtual machines to simulate functions of the item, using parameters that are specific to the item and/or that are tailored to the user's device. In some cases, the performance of different items can be compared, e.g. by simultaneous presentation of visual information, and/or item(s) performance can be virtualized in various ways that allow the user to identify differences or capabilities that might otherwise be difficult to discern. The described methods may also recommend products that closely match the user's preferences based on the user's modifications to virtualizations.

18 Claims, 9 Drawing Sheets

VIRTUALIZED PRODUCT EVALUATION AND COMPARISON

BACKGROUND

In the field of e-commerce, consumers may browse and purchase a wide variety of products, without ever having access to the actual product. In some cases, shopping online may include reviewing other consumer reviews, and the like, in order to get a better feel for the product. Such information is being incorporated, more and more, in the web pages offering products for sale. However, while such reviews can sometimes be helpful in assessing the objective strengths and weaknesses of certain products, they are often confusing for a consumer, such as when the reviews vary significantly. They can also be unreliable, such as when the "quality" of a product is determined subjectively, or is dependent on other, often unknown, factors related to the individual user or context of use.

BRIEF DESCRIPTION OF THE DRAWINGS

Various embodiments in accordance with the present disclosure will be described with reference to the drawings, in which.

DETAILED DESCRIPTION

Figure 1:
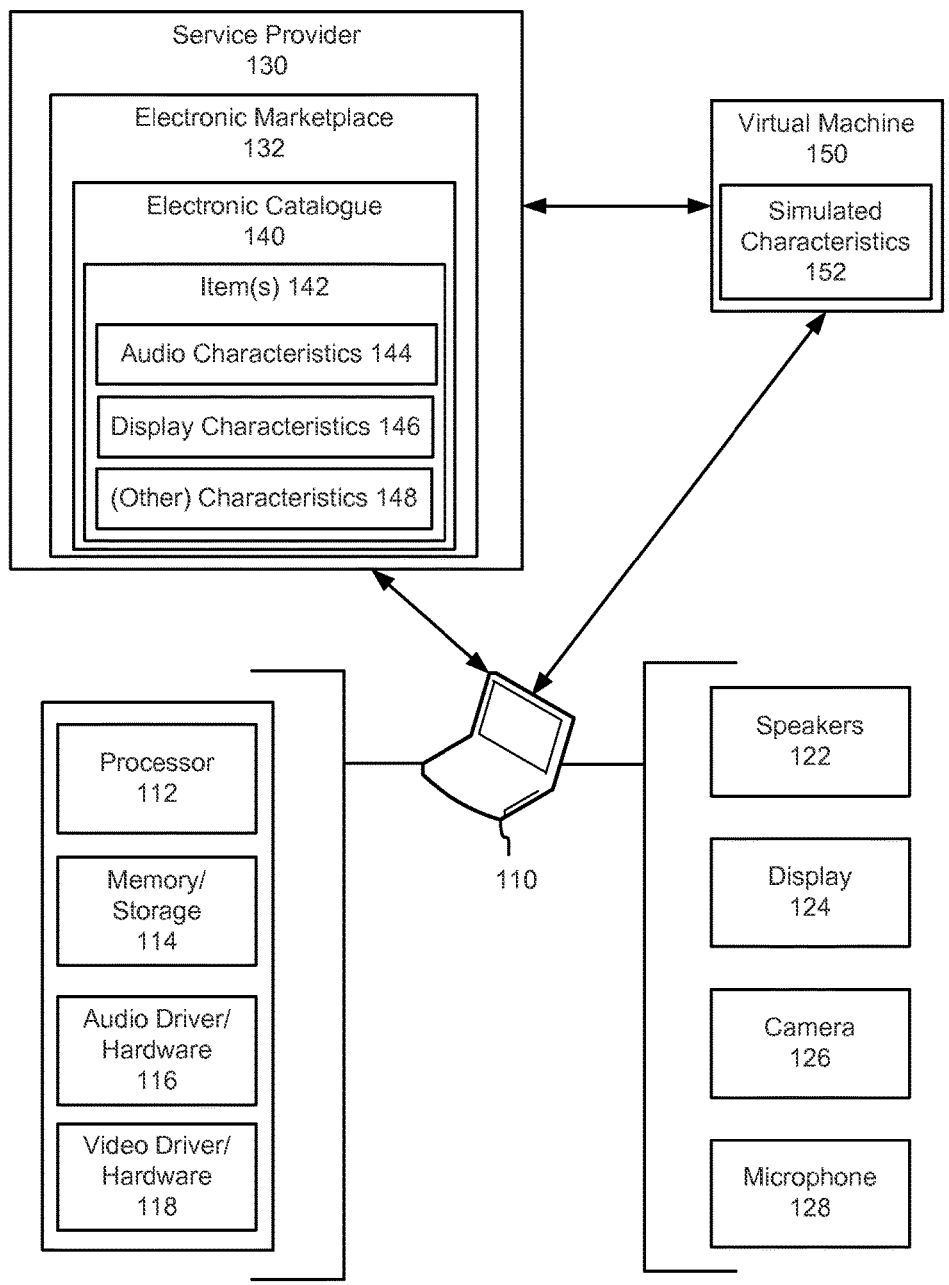
FIG. 1 illustrates an example architecture for implementing a service including virtualization techniques described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

As described herein, the performance of functional items, such as headphones, cameras, etc., can be simulated in the context of a network-accessible electronic catalogue by using virtual machines, and similar techniques. An electronic marketplace may provide a user with the option to sample the performance of an item being browsed, and can generate and/or configure one or more virtual machines to simulate functions of the item, using parameters that are specific to the item and/or that are tailored to the user's device. In some cases, the performance of different items can be compared, e.g. by simultaneous presentation of visual information, and/or item(s) performance can be virtualized in various ways that allow the user to identify differences or capabilities that might otherwise be difficult to discern. The described methods provide additional versatility that allow the user to tailor the simulation(s), such as by setting their own preferences, adjusting simulation parameters, and/or accessing client-side A/V information.

In one example, a user may browse for items in an electronic marketplace. They may view, for example, a listing for a set of headphones using a web browser, or other interface for presenting the items of the electronic marketplace. The user may be presented with an option to simulate the performance of the headphones, and/or to compare the performance of other headphones to the current headphones. The user may select detail pages of three different headphones. Upon identifying that the user has selected one or more of these three different headphones, the system may access parameters associated with the selected headphones, such as audio response, frequency range, options, etc., and may use such parameters in configuring one or more virtual machines that simulate the performance of the selected headphones, e.g. by processing audio files through the virtual machine(s). In some examples, the output of the virtual machine(s) may be presented in different formats. The audio performance of headphones, and the like, may be simulated directly as audio information and/or it may be graphically represented on one or more graphs that show frequency responsiveness in real time or other characteristics. Comparative analyses may be presented to the user in various ways, such as allowing the user to switch between different audio simulations, or simultaneously presenting (e.g., side-by-side) graphical representations of processed audio data. This comparison table may be presented within a virtual shopping cart or other interface configured to enable the user to select, order and/or purchase one or all of the items presented therein. The comparison table may be updated dynamically, for example, if the user makes adjustments to the virtual machine(s), rates one or more simulated headphones, and/or views another set of headphones.

An electronic marketplace may be provided including a data store (sometimes referred to as an "electronic catalog") with user information and/or listings for items available for sale. As used herein, the term "item," in addition to having its ordinary meaning, is used interchangeably to refer to an item itself (e.g., a particular product) and to its description or representation in a computer system or electronic catalog. As will be apparent from the context in which it is used, the term is also sometimes used herein to refer only to the item itself or only to its representation in the computer system. The electronic marketplace may be configured to provide browsing sessions for users, and to serve content to the users including the display of interactive product listings with various options such as size, color, pattern, model(s), etc. In one example, a user may be viewing digital content (e.g., information objects with associated metadata, links, etc.) using a third-party browser of a user device. In other examples, the user may be viewing items in an electronic catalog using an application that is specifically configured for that electronic catalog. Other means of network-based browsing, shopping, etc. are also envisioned.

In some examples, a web service such as a website, a virtual storefront, a Webstore, etc., may be provided as part of the electronic marketplace, and may be managed by one or more service provider computers (e.g., servers) that host electronic content in the form of, for example, the electronic catalog, with or without associated purchase and billing functionality. The service provider may act independently, or may serve various merchants or tenants. Customers may access the web service to search, view, review, discuss, order, stream and/or purchase items (e.g., physical items or services) from the web service.

In some examples, virtualization of various audio/visual functions are described. As used herein, "audio/visual" should be broadly construed as encompassing any of audio output, audio input, image capture, image display, video capture, or video display, as well as combinations thereof. Unless otherwise specified, an "audio/visual function" should be construed as audio and/or video.

Some or all of the processes described herein, or variations and/or combinations thereof, may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The techniques described above and below may be implemented in a number of ways and in a number of contexts. Several example implementations and contexts are provided with reference to the following figures, as described below in more detail. However, the following implementations and contexts are but a few of many.

As shown in FIG. 1, a network environment in which certain examples may be implemented may include a client computing device 110 in communication with a service provider 130, e.g. over the Internet, or other local area network (LAN), wide-area network (WAN), a virtual private network (VPN), intranet, extranet, public switched telephone network, infrared network, wireless network and any combination thereof.

Client device 110 may be any type of computing device such as, but not limited to, a mobile phone, a smart phone, a personal digital assistant (PDA), a laptop computer, a desktop computer, a thin-client device, a tablet PC, an electronic book (e-book) reader, a wearable computing device, a gaming system, etc. The client device 110 is depicted as including at least processor(s) 112, memory/storage 114, audio driver/hardware 116, video driver/hardware 118, and may have various combinations of integral, and/or peripheral devices, such as, speaker(s) 122, display(s) 124, camera(s) 126, microphone(s) 128, etc. The peripheral elements should be broadly understood as encompassing similar types of peripherals known in the art, such as headphones, projectors, televisions, as well as other networked devices and computer systems.

The client device 110 may also include or be connected to various I/O device(s), such as a keyboard, a mouse, a pen, a touch input device, a 3D scanner, a printer, etc. Additionally, the client device 110 may be part of the distributed system managed by, controlled by, or otherwise part of the service provider computers 130.

Service provider 130 may provide an electronic marketplace 132, e.g. using one or more service provider computers (e.g., servers) that host electronic content in the form of the electronic catalog 140. The service provider 130 may act independently, or may serve various vendors or tenants. Customers may access the electronic marketplace 132 via various types of user devices to search, view, review, discuss, order, stream and/or purchase items (e.g., physical items or services) from the service provider 130 or other merchants.

The client device 110 may be used to browse item listings 142 via the electronic catalogue 140, e.g. using a standard web browser, a specialized application, etc. While viewing item listing(s) 142, the electronic marketplace 132 (or application running on client device 110) may present the user with the option of virtualizing the performance of functions associated with item(s) being viewed. For example, if a camera is being viewed, an option to virtualize the image capture quality of the camera may be presented, or if a printer is being used, an option to virtualize the image reproduction quality of the printer may be presented. Various ways of presenting such options are discussed further below, with reference to exemplary GUIs etc.

If the user chooses, or the process is otherwise initiated, the electronic marketplace 132 (or client device 110) may cause a virtual machine (VM) 150 to be generated and/or configured to simulate a feature of a selected item. In general, virtual machines are understood to be emulations of particular computer systems, based on the computer architecture and functions of a hypothetical computer. However, the present subject matter provides for virtual machines that can simulate functions of many different electronic devices, such as speakers, headphones, microphones, cameras, printers, displays, projectors, etc. (and combinations thereof). The virtual machine 150 may include one or more algorithms used to generate simulated characteristics 152 based on one or more of audio characteristics 144, display characteristics 146, or any other characteristics 148, features, etc. associated with the item being simulated. For example, various computer systems may be configured to generate virtualizations of a particular function such as audio output, image reproduction, etc. Each type of virtualization may have a predetermined set of variable parameters used in one or more algorithms that can be set according to parameters associated with individual items.

One relatively simple virtual machine might allow for audio reproduction with variable frequency parameters, e.g. upper and lower frequency range limits set by one set of variables as limits in the audio reproduction algorithm, specific frequency boosting via one or more additive functions in the algorithm, and/or squelching via one or more subtractive functions in the algorithm, etc. A given set of headphones may have upper and lower frequency limits that the speakers are capable of reproducing, and those limits may be stored as performance parameters, e.g. in association with the item listing or as a generally accessible set of parameters that apply to similarly limited items. If a user selects the given set of headphones from the electronic catalogue 140, and chooses to sample the audio performance, VM 150 may be configured by substituting the corresponding frequency limits as variables in the audio reproduction algorithm of the VM, and an audio file or stream may be processed by the newly configured VM 150. When the processed audio is presented (e.g. using audio or visual means of the client device 110), the user can hear how the frequency limits affect the playback of the music or other audio. It should be understood that much more sophisticated algorithms may be applied to audio, and other functions described herein. Such algorithms may include, for example, full range audio and environmental modeling, display modeling representing various input feeds, quality, resolution, and viewing preferences, image capture simulations under various environmental settings, etc. As such, a wide range of possible virtualizations and associated algorithms may be used in the context of sampling, simulating and/or presenting audio reproduction, audio capture, image/video display, image/video capture, and other item functions. These may include, without limitation, dynamic time wrapping (DTW), fast Fourier transform (FFT), sound pattern matching, pitch detection algorithms, Monte Carlo methods, optical and sensor modeling, resolution matching, virtual sound and/or light positioning, full-spectrum lighting simulations, etc. The range of corresponding characteristics that are associated with individual items may also take many forms depending, for example, on the sophistication and intent of VM algorithms being used.

In some examples, simulated characteristics 152 of the virtual machine 150 may be based, at least in part, on characteristics of the client device 110, such as audio driver/hardware 116, video driver/hardware 118, or peripherals of the client device 110, such as internal or external speakers 122, embedded or external display 124, embedded or peripheral camera 126, embedded or peripheral microphone, etc. For example, for image reproduction, the VM 150 may be configured based on the size and resolution of the display 124, such that an appropriately sized image is reproduced with the correct resolution. Likewise, audio hardware associated with the client device 110 may have limitations, e.g. number of speakers, frequency response, etc., that limit the ability of the user to receive accurate simulations via the client device 110. In those situations, it may be appropriate to prevent the user from receiving a virtualization that will not be accurately rendered, to change the virtualization format (e.g. show the audio performance using graphs instead of audio reproduction), and/or to advise the user about the conflict.

The information that is processed by the VM 150 can be obtained from many different sources. For example, the electronic marketplace may have its own catalogue of music, video or other files that the user can select to process. The service provider 130 may provide, or have access to, subscriber accessible files, purchased content, etc., that a registered user can access and have fed to the VM 150. The client device 110 may have access to files, or streaming sources, that it can feed to the VM 150. Additional details regarding various configuration processes are discussed further below.

Figure 2:
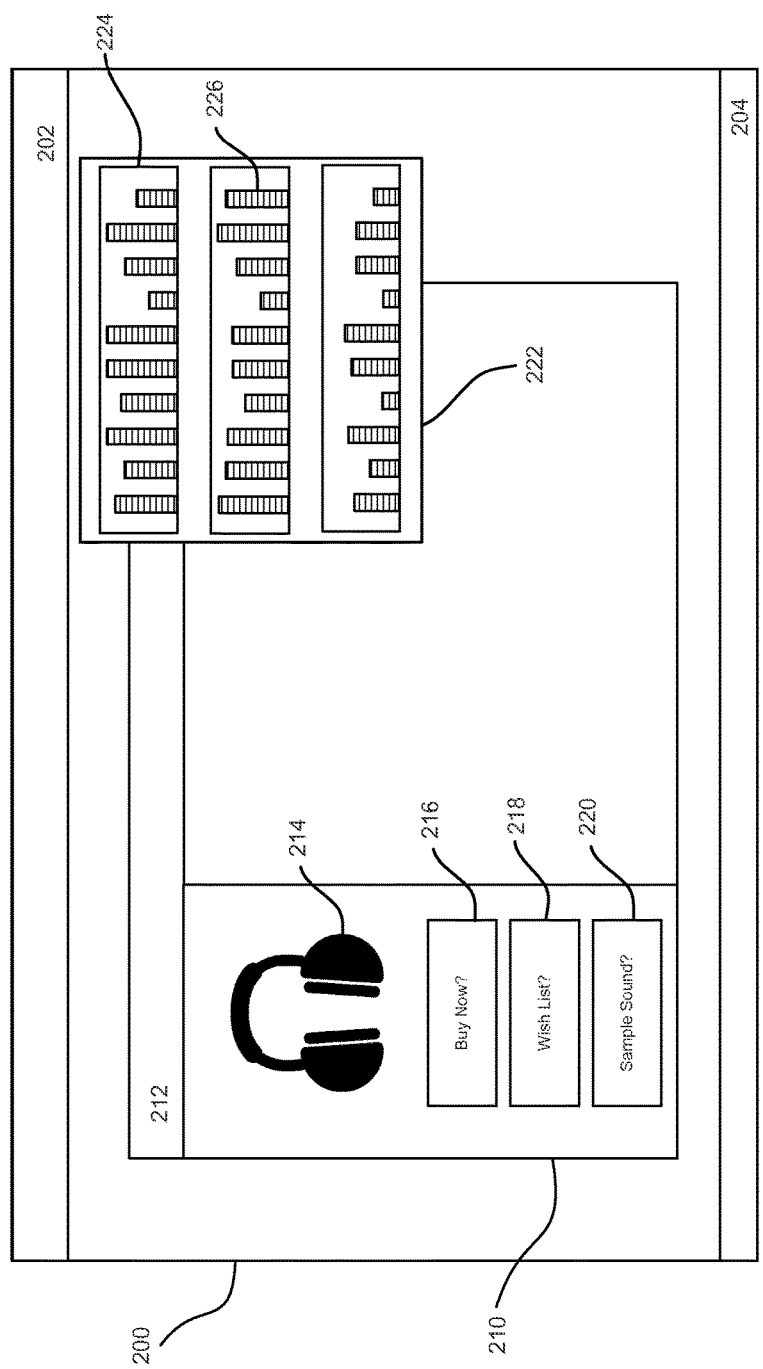
FIG. 2 illustrates an example GUI for presenting virtualization results, according to at least one example.

FIG. 2 shows additional details regarding an exemplary display and GUI that may be shown on a client device, such as client device 110 shown in FIG. 1. The display 200 may be included in any number of electronic devices such as a smartphone, a tablet computer, a laptop computer, a desktop computer, a network-enabled television, an electronic book reader, a gaming device, a wearable computing device, etc.

In the example shown in FIG. 2, display 200 includes tool/command bars 202, 204, and an application window 210. In some examples, the application window 210 may be a browser, an e-reader application, a game, a multimedia player, a social media application, or other first party or third party application. As used herein, first party applications should be understood as those applications that are provided by default with a device when delivered to the user and/or developed by an entity that also provides the device and/or the operating system of the device, whereas, third party applications are typically those that the user adds to a device that are developed by third-parties other than the entity that also provides the device and/or the operating system of the device (e.g., by downloading, sideloading, etc.).

Within application window 210, another tool bar 212 may be present, along with application content, in this case a display of item information 214 (a headphone item image), and icons 216, 218, and 220, which may be based on the exchange of information with an electronic marketplace, such as electronic marketplace 132 in FIG. 1. Item listings, such as represented by item information 214, may include, for example, images of the relevant items, links to allow purchase of the items, and all manner of associated metadata such as variable parameters like color, size, pattern, characteristics, specifications, etc. Item listings may also be understood, in some examples, as representing different areas of a network page, different areas of a gaming or social media application, different areas of an e-magazine or other documents, etc.

The icons 216 and 218 are user-selectable "buttons" (e.g. "Buy Now?" and "Wish List?") related to browsing, and purchasing item(s) from listings in an electronic catalogue, such as electronic catalogue 140. Icon 220 may be configured as a user-selectable option that launches a simulation related to item 214. The presence of icon 220 may be determined based on, for example, whether the listing has a function that is capable of simulation, whether the electronic catalogue and/or application have access to sufficient information to render the simulation, whether the user prefers to have this option shown, and/or whether the client device has the capability to render the simulation. The use of intuitive icons, such as icon 220, that help alert the user to available virtualizations can be applied to a variety of content, and has applicability, for example, in the context of a browsing/search session such as that performed on an e-commerce site with various items for sale and associated listings with multiple options, related items, accessories, information pages, etc.

If icon 220 is selected by the user, or otherwise activated, an associated simulation may be launched and/or configured based on characteristics of the item 214 (e.g. frequency performance parameters), characteristics of the client device being used (e.g. capabilities of the audio driver, etc.), user preferences, etc. The simulation window 222 represents aspects of a simulation, e.g. a virtual machine, that has been launched and configured based on characteristics of the headphones item 214. Simulation window 222 includes a plurality of frequency graphs 224, each of which has individual levels 226 that can be modified in substantially real time based on an audio file or stream that is being processed by the simulation.

In some examples, the simulation window 222 may be interactive and may, for example, allow the user to modify the simulation by changing levels, applying filters, etc. The user's changes can then be applied by the underlying simulation, and provide a virtualization that is based on item characteristics and the user's preferences. The modified virtualization can also be analyzed, e.g. by an application on the client device and/or a process running on servers of the electronic marketplace, to generate item recommendations to the user. For example, the user may increase a bass level in the simulation window 222 to better suit their preference. The modified virtualization can then be analyzed to determine the user's preference and item listings and associated parameters, e.g. in the electronic catalogue, can be searched to determine if there is a set of headphones that match the user's preference.

In addition to, or instead of, the simulation window 222, audio data processed through the simulation may be output as audio to speakers attached to, or in communication with, the client device. In such cases, it is possible to include an analysis of the capabilities of the audio out of the client device to determine whether an accurate audio simulation for the item 214 is possible. For example, the parameters for item 214 may include a relatively broad frequency range or surround sound capability (for high-end headphones), whereas the speakers of the client device may have a more limited range, responsiveness and/or surround sound capability. Therefore, the system may determine that the client device is not capable of accurately reproducing an accurate audio virtualization of the item 214. In such cases, the application 200 may default to only visual presentation, like in window 222, or may alert the user that they are not hearing an accurate simulation of the item 214.

Therefore, it will be appreciated that an application such as shown in FIG. 2 can support a user finding a product (like headphones) that they are interested in purchasing, and providing a direct virtualization of the product's performance that the user can evaluate. In some examples, the user may search for a product, such as headphones, select a color and/or accessories for the product, and then choose to see/listen/verify the sound quality. The user can also be allowed to select verification options (including the type(s) of virtualization presentation, as well as other preferences), which can be done, for example, in a new window/popup for the user (which may allow different setup options and/or presentation adjustments).

In some examples, a specific sound file may be fetched, e.g. in O(1), and configuration parameters applied to the virtual audio player (e.g. bass/mid/treble value(s), buffer(s), filter(s), etc.), based on an item identifier associated with item 214. Such details may be pre-stored in an accessible database (or locally in buffer or memory of the client device) and fetched to select the appropriate sound handler and play the appropriate sound file. Parameters for various items with similar functionality may be pre-stored and managed, for example, by Voronoi regions and/or using Octree to fetch and retrieval for specification(s) and test files in O(1). For example, for a given item (or unique item identifier) there may be multiple configuration files/settings that can be used to configure one or more virtual machines (e.g. audio, visual, etc.). These configurations may be stored in an Octree (or other) manner so that the unwanted configuration settings may be filtered out, and the desired configurations to be loaded more quickly, thereby allowing the user to hear and/or see the desired virtualization(s) rapidly. Additionally, for items (or unique item identifiers) and/or configurations that are browsed by customers relatively frequently, the virtualization performance may be improved, for example, by storing and updating popular configurations and their required configs/settings/data in Voronoi regions (which may be implemented together with Octree structure(s)) so as to provide rapid retrieval of the desired configurations. O(1) access may also be used to fetch the configuration data rapidly using one lookup, increasing the rates by which retrieval of the desired settings, and rendering of the virtualization, may be achieved. For popular items and/or configuration settings, configs/settings/data may be stored along with hash maps (e.g. associated with unique item identifiers) to access the configuration data.

Figure 3:
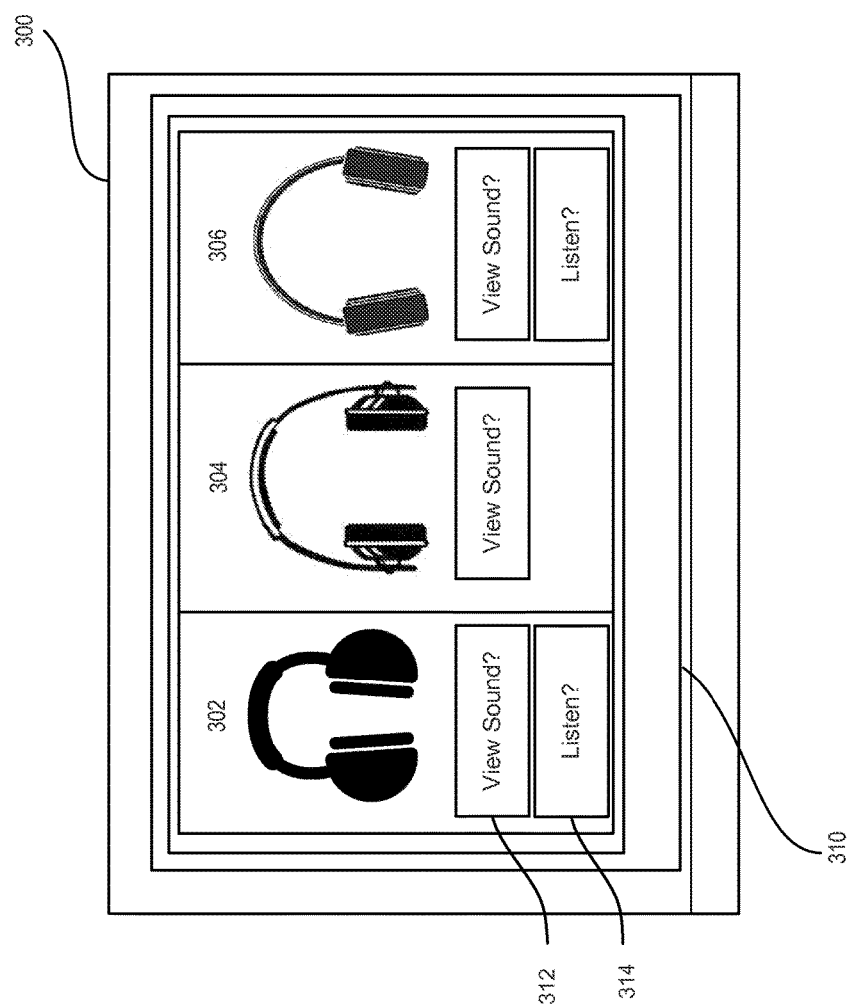
FIG. 3 illustrates an example GUI for presenting virtualization options, according to at least one other example.

FIG. 3 shows a display 300 including an example of application 310 displaying multiple selected items 302, 304, and 306 (which are different headphones in this case). In this example, a determination is made regarding what format of simulation presentation is possible for each of the items 302, 304, and 306. Item 302 is shown as having icons 312, 314 for "View Sound?" (e.g., for viewing sound graph(s)) and "Listen?" (e.g., to listen to a virtualized presentation of how an audio stream or file would sound through headphones 302). On the other hand, item 304 only has an icon for "View Sound?", meaning that a determination has been made not to offer the "Listen?" icon. As mentioned previously, this could be based on a number of factors related to availability of capabilities/parameters of the item 304 to provide a virtualization, capabilities/parameters of the client system (and associated peripherals) being used, and others.

In some examples, the first selection of an icon type (such as a "Listen?" icon) can prompt the generation of a virtualization with the parameters associated with one item (e.g. 302), and a subsequent selection of a similar icon for a different item (e.g. 306) can prompt reconfiguration of the virtualization to simulate the different item. In other cases, each item may have its own virtualization generated and the system can switch back and forth, or simultaneously present the different virtualizations.

Figure 4:
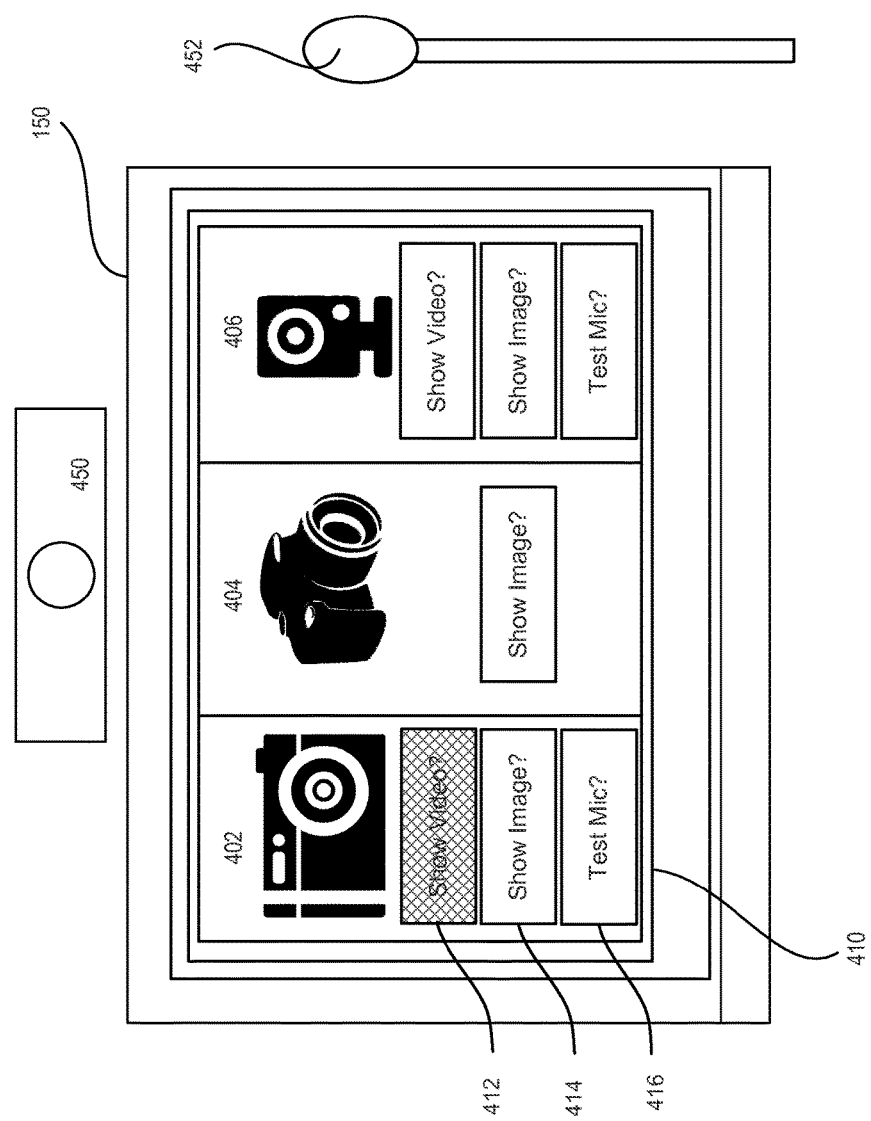
FIG. 4 illustrates another example GUI for presenting other virtualization options, according to at least one other example.

FIG. 4 shows a display 400 including an example of application 410 displaying multiple selected items 402, 404, and 406 (which are different cameras in this case). Although generally depicted as a digital camera 402, an SLR camera 404, and a webcam 406, it should be understood that any device with a camera function may be included, e.g. a smartphone, a surveillance camera, etc. A camera 450 and microphone 452 are also associated with the display 400, and may be, for example, integral with a client device including display 400, or connected peripherals. The client device may use such accessories to feed information to one or more virtualizations. For example, if the user is reviewing the video capture function of an item for sale, the camera 450 may be used to capture a video stream that is fed to the camera simulation. Likewise, if the user is reviewing the audio capture (or reproduction) function of an item, a sound stream can be captured by microphone 452 and fed to the audio simulation.

In the example shown in FIG. 4, a determination is made regarding what functions each of the items 402, 404, and 406 are capable of (e.g. by referring to information in the item listing, etc.) and simulation icons appropriate to the item's function(s) (and/or client system capabilities) are displayed. Item 402 is shown as having icons 412 for "Show Video?" (e.g. because the camera has a video capture capability), 414 for "Show Image?" (e.g. because the camera has a still image capture capability), and 416 for "Test Mic?" (e.g. because the camera has an audio capture capability). In the example shown in FIG. 4, the icon 412 includes indicia (e.g. shading or other cue) that suggests that a given simulation may be insufficient based on one or more criteria. For example, in a case where the camera 402 has a better video capture resolution than camera 450 (and/or the display 400), the indicia may show the user that any simulation using video from camera 450 (and/or shown on display 400) may not have sufficient resolution to simulate the actual video capture capability of camera 402. These are just some examples among many that may compare parameters used for a simulation to capabilities of the client system (and peripherals). It is noted that many techniques exist for automatically determining device capabilities in modern computing, network communications, and home entertainment. Therefore, it is possible for many such determinations to be made automatically without human interaction. Of course, it is also possible to query the user or otherwise allow the user to manually enter such information, e.g. when it cannot be automatically determined via the devices themselves or from user records.

Returning to FIG. 4, item 404 only has an icon for "Show Image?", meaning, for example, that a determination has been made that the item 404 does not have a video or audio capture function, or there is insufficient information to configure an appropriate virtualization. Item 406 is a webcam having video, image, and audio capabilities that are capable of virtualization via the client device. In some examples, it may also be possible for an application, like 410, to display a presentation based on the camera 450, microphone 452, or other item that the user has, for comparison purposes with virtualizations related to items 402, 404, and/or 406. For example, a window including an unmodified video capture from camera 450 may be generated, along with a virtualization of webcam 406 using the same video feed. Therefore, the user can see differences that a given product would provide compared to what they already have. Similar comparisons can be done, for example, with microphones, speakers, headphones, printers, displays, etc.

Figure 5:
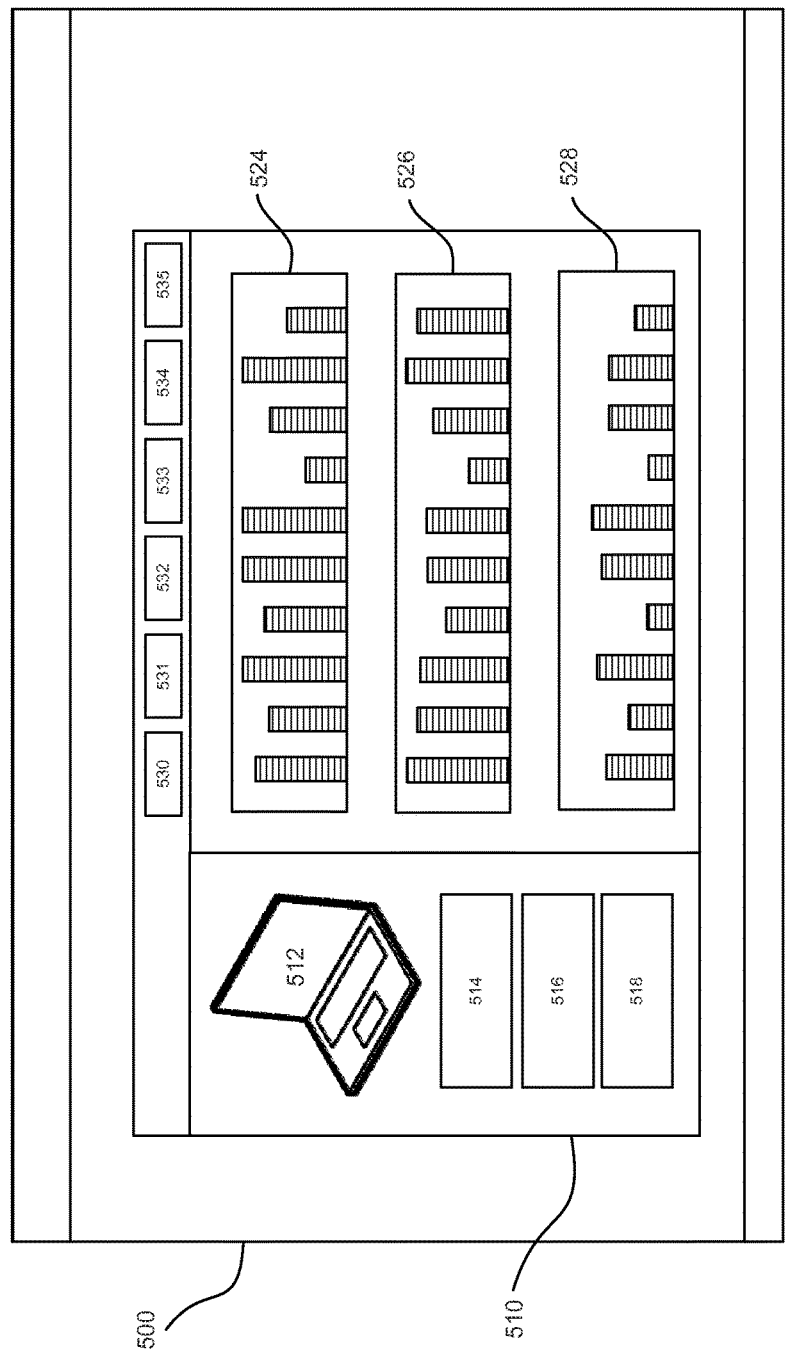
FIG. 5 illustrates an example GUI for presenting virtualization results for different components or devices, according to at least one other example.

FIG. 5 shows one example whereby different simulation presentations can be displayed simultaneously for the user to compare. Display 500 includes application 510 by which the user is browsing an item 512, in this case a laptop computer. Icons 514, 516, and 518 may be associated with different components, options, models, etc. that have different performance parameters associated with them. For example, the item 512 may have different sound card options, with icon 514 representing a high-end sound card with surround sound and excellent frequency response, icon 516 representing a mid-range sound card, and icon 518 representing no (or native) sound card with minimal functionality. As another example, the item 512 may have different speaker, camera, printer options, etc., with icons 514, 516 and 518 representing different options. By selecting icon 514, a simulation window 524 may be presented. This can include generating and/or configuring a virtual machine with parameters associated with the option represented by icon 514. By selecting icon 516, a simulation window 526 may be presented. This can include generating and/or configuring a virtual machine with parameters associated with the option represented by icon 516. By selecting icon 518, a simulation window 528 may be presented. This can include generating and/or configuring a virtual machine with parameters associated with the option represented by icon 518. The same information, e.g. audio, video, or image streams or files may be fed to the virtualizations used to generate windows 524, 526, and 528. As such, the user can see differences in how the options represented by icons 514, 516, and 518 perform. The windows 524, 526, and 528 may also be interactive in ways that allow the user to modify the underlying virtualizations, as previously described.

Additional setting(s) icons 530-535 may be presented that allow the user to modify the simulations in specific ways. For example, a set of speakers represented by icon 514 may have a predefined bass boost, or other selectable option, that is reflected in the item listing and performance parameters. If such a feature is recognized, the application 510 may add an icon, e.g. 530, that allows the user to turn that function on and off, e.g. for the virtualization used to generate window 524. Selecting the icon 530 will then reconfigure the relevant simulation and allow the user to see and/or hear the difference using the predefined option of the item. Similar options can be presented, for example, based on audio environment settings, audio filters, imaging filters, resolution settings, or any other predefined setting that may be associated with an item.

As another example, icons 530-535 may reflect other item functionality related to a given virtualization. For example, if a user is reviewing the image performance of a camera with a zoom capability, icons 534 and 535 may be configured to receive zoom in and zoom out commands. The profile for the given camera may include parameters that reflect, for example, the overall zoom limits, zoom speed, and/or the limits of where the manual zoom is replaced by a digital zoom. The user can then view the actual change in resolution and image quality as they zoom in or out (virtually) using icons 534 and 535.

In some cases, application 510 may be configured to combine performance parameters for different items in configuring a virtualization. This can be done in a number of ways. For example, if an item 512 (such as a stereo amplifier) performs differently with different speakers, then performance parameters for the item 512 may be loaded into a virtual machine, in combination with parameters for a first set of speakers, and the results displayed in window 524. Alternatively, a manufacturer, or other entity, may create modeling data with parameters for a given combination of items, e.g. based on their own testing, and the combined parameters can be stored and loaded together. As yet another example, each of icons 514, 516, and 518 may represent a component of a multi-part system that generates a combined outcome. For example, item 512 may be a display, like a television, icon 514 may be a certain type of cable that connects the television to a DVD player, and icon 516 may be a certain DVD player. The parameters associated with all of these components can be combined and show, for example, the image quality that the user can expect with this combination of components. The user can then swap out various components and reconfigure the virtualization, or assemble alternative combinations, to see how they affect the overall outcome.

Figure 6:
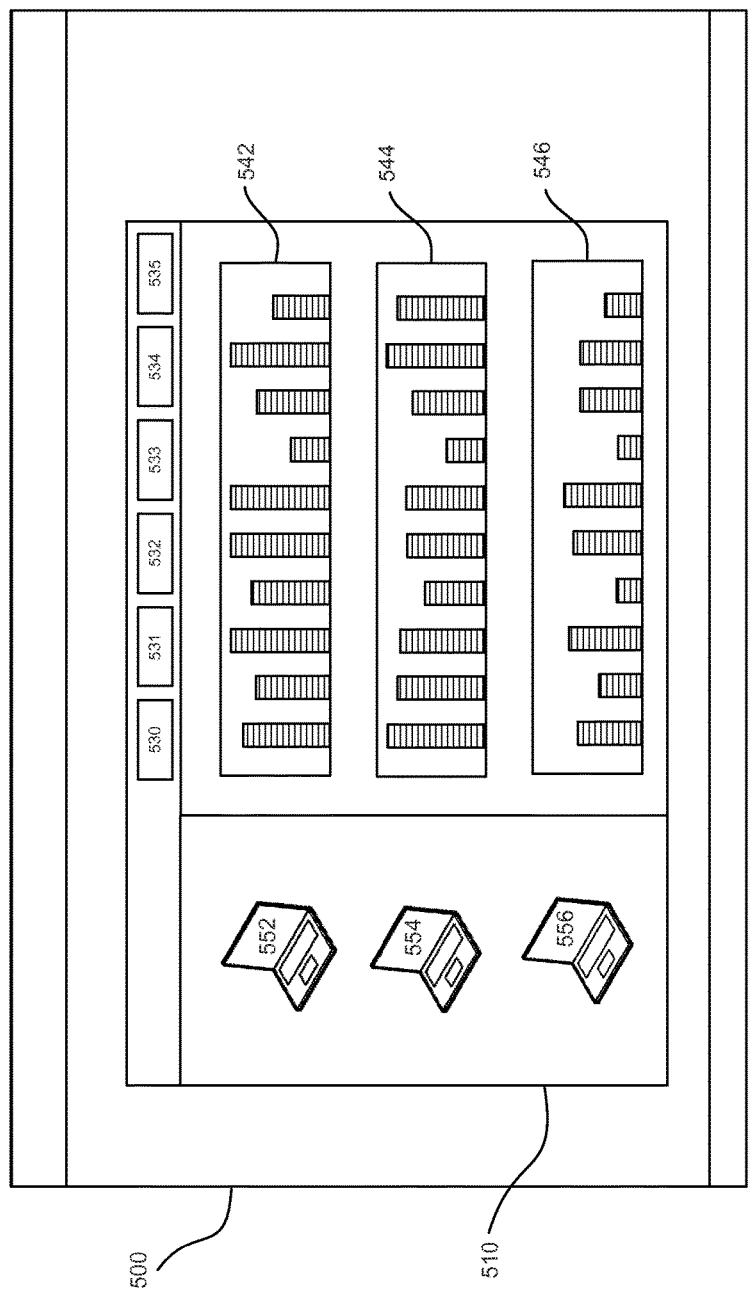
FIG. 6 illustrates another example GUI for presenting virtualization results for different devices, according to at least one other example.

FIG. 6 shows another example whereby different simulation presentations can be displayed simultaneously for the user to compare. Display 500 includes application 510 by which the user is browsing items 552, 554, and 556, in this case multiple laptop computers having different audio or display characteristics. Application 510 may also include a corresponding VM window 542, 544, and 546 for each of items 552, 554, and 556, respectively. This can include generating and/or configuring a virtual machine with parameters associated with the audio, visual, or other function, of items 552, 554, and 556. The same information, e.g. audio, video, or image streams or files may be fed to the virtualizations used to generate windows 542, 544, and 546. As such, the user can perceive differences in how the similar function(s) of items 552, 554, and 556 compare to one another. The windows 542, 544, and 546 may also be interactive in ways that allow the user to modify the underlying virtualizations, as previously described.

Additional setting(s) icons 530-535 may be presented that allow the user to modify the simulations used to generate windows 542, 544, and 546 in various ways. For example, the user may be allowed to apply similar environments and/or characteristics to each of the simulations by choosing one or more of icons 530-535. This may include, for example, an audio environment (such as specific acoustic parameters of a user's room), that is applied to an audio reproduction VM, or an image capture environment (such as dim room lighting), that is applied to an image capture VM. Icons 530-535 may also be configured to select between various sources, files, and/or streams that can be used by the simulations that generate windows 542, 544, and 546. For example, the icons 530-535 may allow the user to select between different audio sources and/or simulations, different images and/or video files or streams, etc.

In some cases, application 510 may be configured to provide recommendations to a user based on, for example, modifications to any of virtualization windows 542, 544, and 546 (which may be interpreted as parameter adjustments), or rankings/ratings of particular virtualizations. Such recommended items may be presented, for example, as any of items 552, 554, and 556, and a new virtualization may be generated and/or configured based on parameters associated with the newly-recommended item.

Any of the item viewing areas in applications 210, 310, 410, and 510 depicted in FIGS. 2-6 may be configured with embedded functionality that allows a user to view, compare, preview and/or purchase a recommended item (e.g. items 214, 302-306, 402-406, 512, 532-536, and/or 552-556) shown therein. Additionally, the configuration and content of any of the applications 210, 310, 410, and 510 depicted in FIGS. 2-6 may be modified by dynamic virtualization processes as described herein. For example, the content of the applications may be modified to include virtualization presentations that are tailored to a specific user, client device, peripheral etc.

Figure 7:
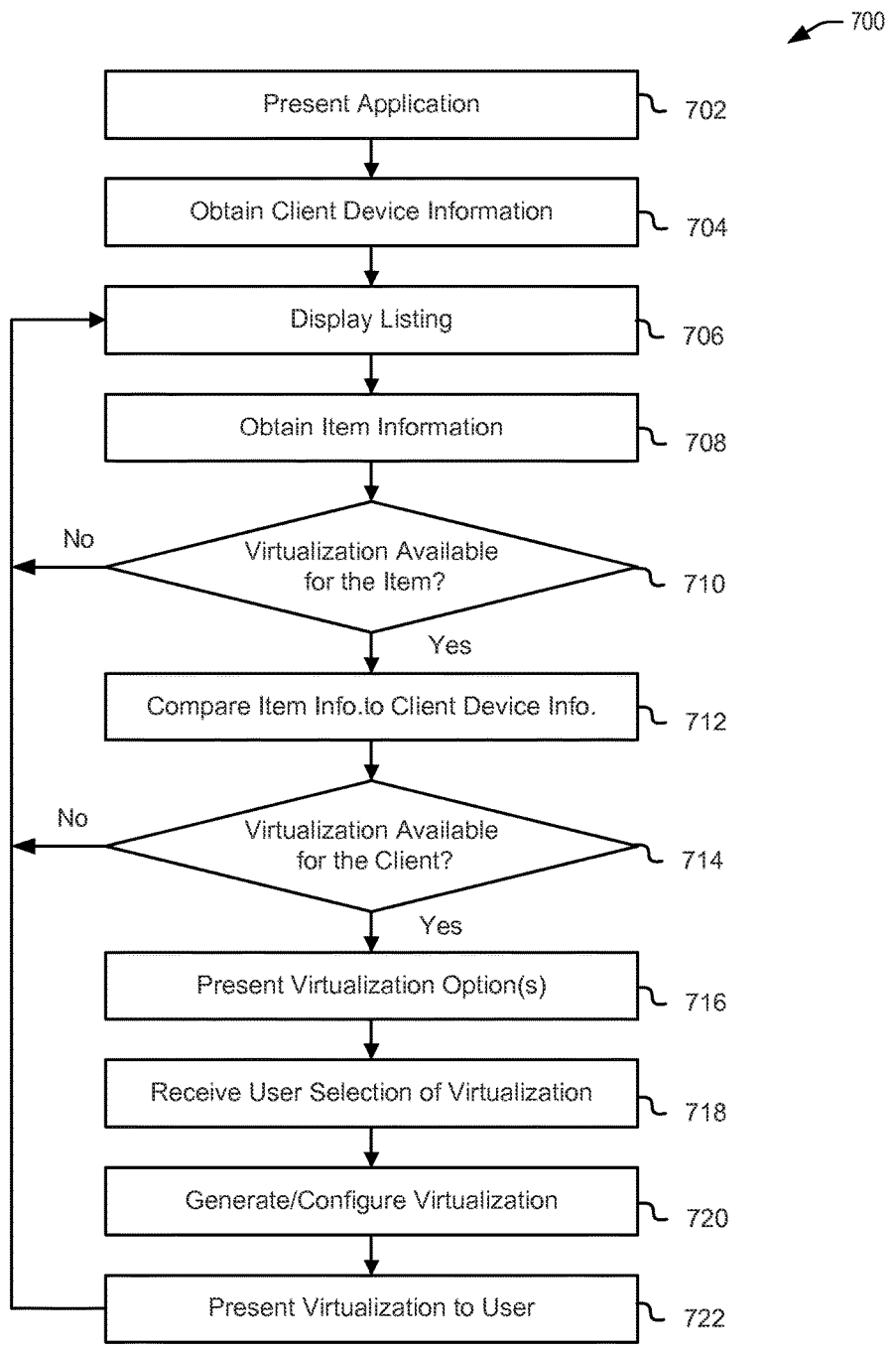
FIG. 7 is a flow diagram depicting an exemplary process for providing virtualizations as described herein, according to at least one other example.
Figure 8:
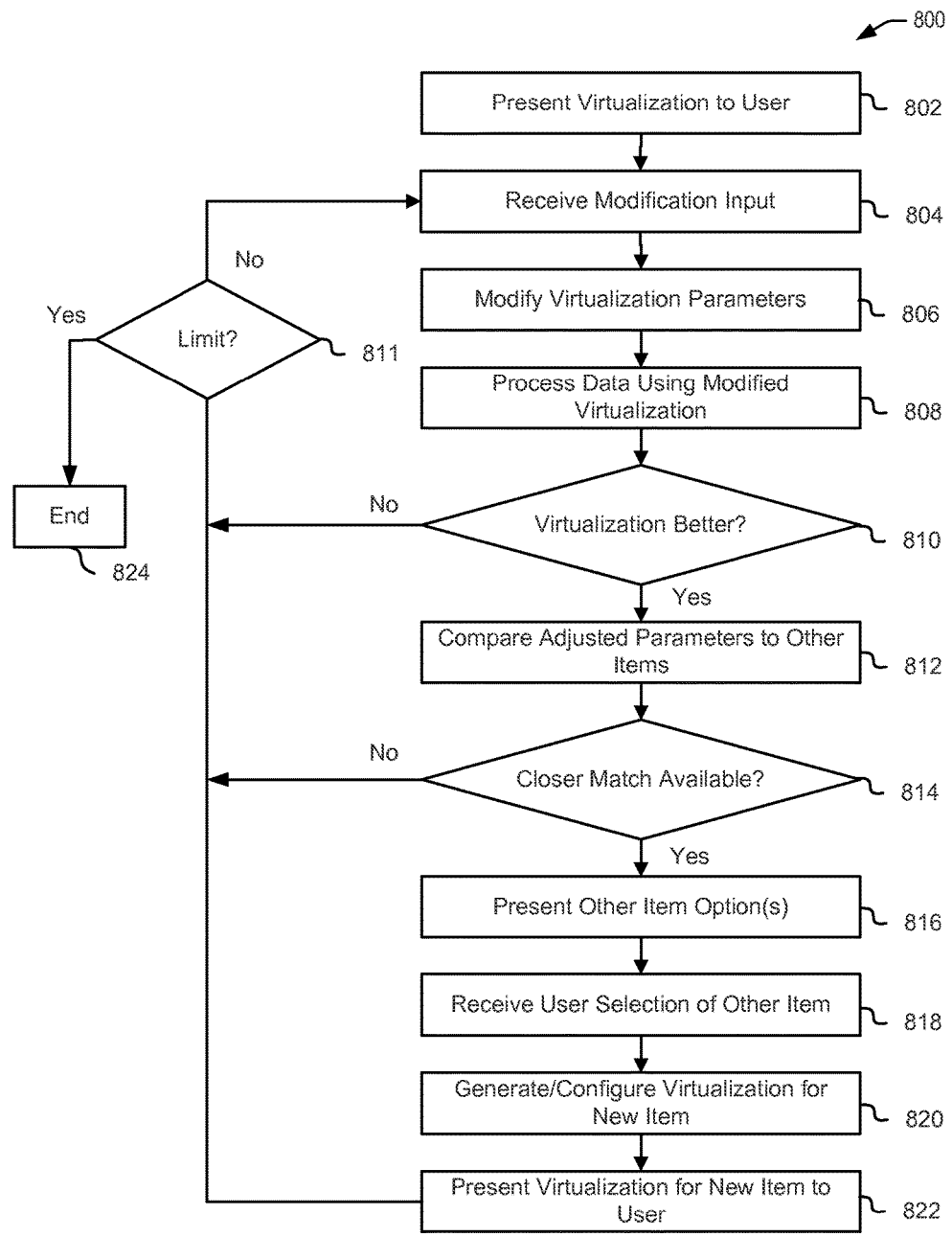
FIG. 8 is a flow diagram depicting an exemplary process for providing recommendations based on changes to a virtualization as described herein, according to at least one other example.

FIGS. 7 and 8 depict a flow diagrams of item virtualization processes according to other examples. Each operation depicted therein may represent a sequence of operations that can be implemented in hardware or computer instructions implemented in hardware. In the context of computer instructions, the operations represent computer-executable instructions stored on one or more computer-readable storage media that, when executed by one or more physical processors, perform the recited operations. Generally, computer-executable instructions include routines, programs, objects, components, and the like that perform particular functions or implement particular data types. The order in which the operations are described is not intended to be construed as a limitation, and any number of the described operations can be omitted or combined in any order and/or in parallel to implement the processes. Additionally, any specific reference to one or more operations being capable of being performed in a different order is not to be understood as suggesting that other operations may not be performed in another order.

FIG. 7 is a flow diagram depicting an example process 700 for providing item virtualization, including consideration of client device capabilities. Process 700 may begin with 702 in which a first application is presented on a client computing device, such as application 210 shown in FIG. 2. In some examples, the first application may be a browser, an electronic book reader application, a game, a multimedia player, or a social media application. Presenting the first application may include initiating a browsing session, e.g., responsive to a user requesting access to an e-commerce site or other network resource. This may involve, for example, a service provider receiving a user request via a WAN, such as the Internet, and replying to the requesting user with instructions for providing an interactive network page.

The process may optionally continue with 704, in which information related to the client device (and/or peripherals) may be obtained. Such information may be gathered automatically, e.g. using plug and play and other automated query and sharing techniques, or a user may be queried (e.g. via GUI) to provide details, such as monitor type, speaker/headphone model, soundcard, phone version, etc. In some examples, the server-side system may be configured to obtain parameters for the client device based on pre-stored files that include information about the capabilities of the device, components and/or peripherals. Relevant information may generally include any parameter that relates to virtualization functions that the application is capable of presenting.

The process may continue with 706, in which a listing or other information object is displayed by the first application. The first application may display any number of listing/information objects, such as images, video, text, with or without associated metadata. In some examples, the listing may include an item for sale and an image or video of the item for sale. The image and/or video may be manipulable by a user of the computing device in various ways, such as changing features such as color or accessories. For example, an information object representing an item for sale (or multiple items for sale) may be presented in a display area, such as shown in FIG. 2, and may be rotated for different viewing angles, and/or may have other displayable options changed.

The process may continue with 708, in which information about the item in the listing is obtained. This may include, for example, indicia about specific functions that the item is capable of performing, controls related to the function(s), qualitative parameters associated with the function(s), other characteristics or specifications, etc. As mentioned previously, the information/parameters that may be relevant are quite varied and typically will depend on the function that is to be simulated. In some cases, there may only be a small number of parameters, e.g. frequency range for a simple audio virtualization, that may be modeled, whereas others may include a large number of diverse parameters, such as chip resolution and sensitivity, lens characteristics, zoom, aperture, shutter speed and other pre-designated controls for a camera simulation, that may be modeled.

The process may continue with 710, in which the information about the item may be analyzed to determine whether a visualization is possible for any function of the item. This may include, for example, determining whether the item has any function(s), determining whether the obtained information is sufficient for an available modeling technique/application, determining if additional, necessary information is available and/or accessible, etc. If 710 results in a determination that no virtualization is available, the process may return to 606 and continue to display listing(s) for the user until such time as a virtualization is indicated.

If 710 determines that a virtualization is available for the item, the process may continue with optional step 712, in which information about the item and/or available virtualization is compared to information about the client device and/or peripherals. In some examples, this may include confirming whether the client device/peripherals are capable of presenting the available virtualization, including the necessary resolution, frequencies, surround sound or other performance characteristics. In some examples, this may include generation of a VM, or reconfiguration of an existing VM, based on the information about the item and/or the information about the client device/peripherals, e.g. in order to fully compare what the expected VM presentation may include compared to the capabilities of the client device.

The process may continue with 714, in which the results of comparing the item and/or available virtualization and the information about the client device and/or peripherals may be analyzed to determine whether the virtualization is available for the client. In some examples, this may include providing the user with an alert about limitations of the virtualization, switching a format of the virtualization, or canceling the virtualization. If the virtualization is canceled or otherwise not compatible with the client device, the process may return to 706 until such time as a virtualization is indicated.

If 714 determines that a virtualization is available for the item, the process may continue with optional step 716, in which one or more selectable virtualization options may be presented to the user via the client device. This may include, for example, selectable icons representing one or more functions that can be simulated, or icons that reflect preconfigured options or commands for which the item being modeled is capable, such as zoom, bass boost, etc. In cases where more than one item are being displayed, this may include presenting icons that are appropriate to each of the items on an individual basis. Additionally, displaying the selectable icons may include displaying indicia of at least some of the possible virtualization shortfalls that are determined. In some examples, a virtualization option icon may be combined with an interactive listing, information object and/or object parameter. This may be accomplished, for example, by including virtualization command information in the metadata associated with and/or included in information object(s) being displayed. When an object is selected, e.g., by being clicked, pointed at, etc., the metadata may be obtained and/or analyzed to identify the virtualization commands and/or types of virtualization functions and/or formats appropriate to the item.

The process may continue with 718 in which a user selection related to a virtualization is received. This may include, for example, the user selecting an icon to launch a particular virtualization, and/or selection of options related to certain virtualizations.

The process may continue with 720 in which a virtualization is generated and/or configured based on the user selection(s). This may include, for example, generation of a VM, or reconfiguration of an existing VM based on parameters associated with a particular item that the user is browsing and for which information was obtained in 708, based on information related to the client device/peripherals and obtained in 704, based on user preference information that may have been obtained from user account data or via a query, and/or selection of specific options related to the virtualization.

The process may continue with 722 in which a virtualization is presented to the user via the client device. This may typically include processing information, such as audio, image and/or video information, through the VM generated in 720, and presenting modified information to the user via the client device in one or more formats. As mentioned previously, the information that is processed can be obtained from various sources including, for example, a service provider's files, third party databases, client device audio, image and/or video files, client device generated audio and/or video files or streams, etc. In some examples, simulated audio may be presented in graphical and/or audio formats. Similarly, image and/or video information can be presented in its native format, or graphically represented in various ways e.g. color distribution, brightness levels, etc.

FIG. 8 is a flow diagram depicting an example process 800 for providing recommendations based on user modifications to item virtualizations. Process 800 may begin with 802 in which a virtualization is presented to the user via a client device, such as in 722 in FIG. 7. As mentioned previously, this may typically include processing audio, image and/or video information through a VM, or other technique, and presenting modified information to the user via the client device in one or more formats. In this example, the presentation is interactive, such that the user can make adjustments to the output.

The process may continue with 804, in which the modifications to the virtualization are received. This may take many forms, such as the user adjusting frequency boost levels, color levels, brightness, etc. For example, a user may be looking at one or more frequency spreads as shown in FIG. 5, and decide that the bass on one is a little low. The user swipes the screen or makes another input command that registers as "turning up" the bass for one or more of the virtualizations, e.g. 524 for item 514.

The process may continue with 806, in which the modifications to the virtualization parameters are made. For example, the system may interpret a quantitative or qualitative adjustment received in 804 and translate that to one or more specific parameter adjustments. As in the previous example, if the user "turns up" the bass for virtualization 524, the related bass parameters of item 514 may be analyzed and adjusted to satisfy the requested change. In some instances, there may be several parameters that may meet the desired result, and the system may use fuzzy logic or evolutionary algorithms in determining what specific adjustments to make. In a simple case, a request to "turn up" the base may be implemented by increasing a boost across a predefined frequency range.

Once the relevant parameters for the VM have been modified, the process may continue with 808, in which the information is processed using the modified VM, resulting in a modified output.

The process may continue with 810 in which the user may be queried regarding whether the modified virtualization is an improvement, e.g. whether it appears or sounds better. If the change is not deemed to be an improvement, the process can proceed through one or more checks 811 to determine whether the process should end, or return to 804 (with or without resetting the parameters) and await any further modifications. Step 811 may include, for example, predetermined or dynamic limits on the number of iterations that the flow should execute before proceeding to 824. In 811, a user may also be queried regarding whether they want to continue with the flow 800 or return to a normal browsing mode, or other process, via 824.

If the change is an improvement in 810, the process may continue with 812 in which a comparison may be made between the modified (set of) parameters and profile information for similar devices. For example, if a headset had a profile of (+3 Bass, −1 Mid, +3 Treble), and the user approved a +2 to bass, a new profile of (+5 Bass, −1 Mid, +3 Treble) could be used to search for a match or closer match than the item(s) being currently viewed. If no closer match is found, the process may continue back to 811, and 824 or 804 (with or without resetting the parameters) and await any further modifications.

If a closer match is found in 814, the process may continue with 816, in which the item with the closer profile may be presented to the user. This may take the form of a listing presented as a "suggestion" or may automatically replace one item listing that is being viewed with a listing for the new item. As with 716 in FIG. 7, this may include presenting various options related to available virtualizations for the new item.

The process may continue with 818 in which a user selection related to the new virtualization options is received. This may include, for example, the user selecting an icon to launch the new particular virtualization, and/or selection of options related to the new virtualization/item.

The process may continue with 820 in which a virtualization is generated and/or configured based on the new user selection(s). This may include, for example, generation of a new VM, or reconfiguration of an existing VM, based on parameters associated with the newly selected item.

The process may continue with 822 in which a virtualization for the new item is presented to the user via the client device. This may typically include processing information, such as audio, image and/or video information, through the VM generated or modified in 820, and presenting the newly modified information to the user via the client device in one or more formats.

In some examples, the function being simulated includes an audio output capability of the item being modeled, the electronic data includes audio data, and the first virtualization is an audio virtualization of the audio output capability, and/or a graphic virtualization of the audio output capability.

In some examples, the function being simulated includes a camera capability of the item, the electronic data includes at least one of image data or video data, and the first virtualization is an image capture virtualization of the camera capability, and/or a video virtualization of the camera capability.

In some examples, the function being simulated includes a display capability of the item, the electronic data includes at least one of image data or video data, and the first virtualization is an image virtualization of the display capability, and/or a video virtualization of the display capability.

In some examples, the user may be provided with an interface that allows them to make desired adjustments to, and/or rate, specific virtual machine instantiations. For example, in the case of an audio simulation, the user may be provided with an adjustable equalizer that allows them to change the relative levels of particular frequencies, as well as many other audio adjustments. Based on these adjustments, the system may record a new parameter or set of parameters that can be compared to other known device profiles, e.g. in order to determine a more desirable item for the user. As a simplified example, if the user is listening to a headphone simulation with a sound profile of (Bass: 5, Mid: 7, Treble: 3), and adjusts a treble control on the simulation up two, the system can search for a headphone with a sound profile of (Bass: 5, Mid: 7, Treble: 5). If the search is successful, or at least partially successful, the system can present the user with an option to sample the new recommendation, or automatically add the new recommendation to a set of items being compared.

Similar processes may use simplified rankings (e.g. on a scale of 1-5) that are interpreted by the system to help generate more desirable recommendations for the user. For example, if a user assigns a low rank to items having one or more similar characteristic(s) in their profiles, the system can search for a like product that does not have the shared characteristic in its profile.

Figure 9:
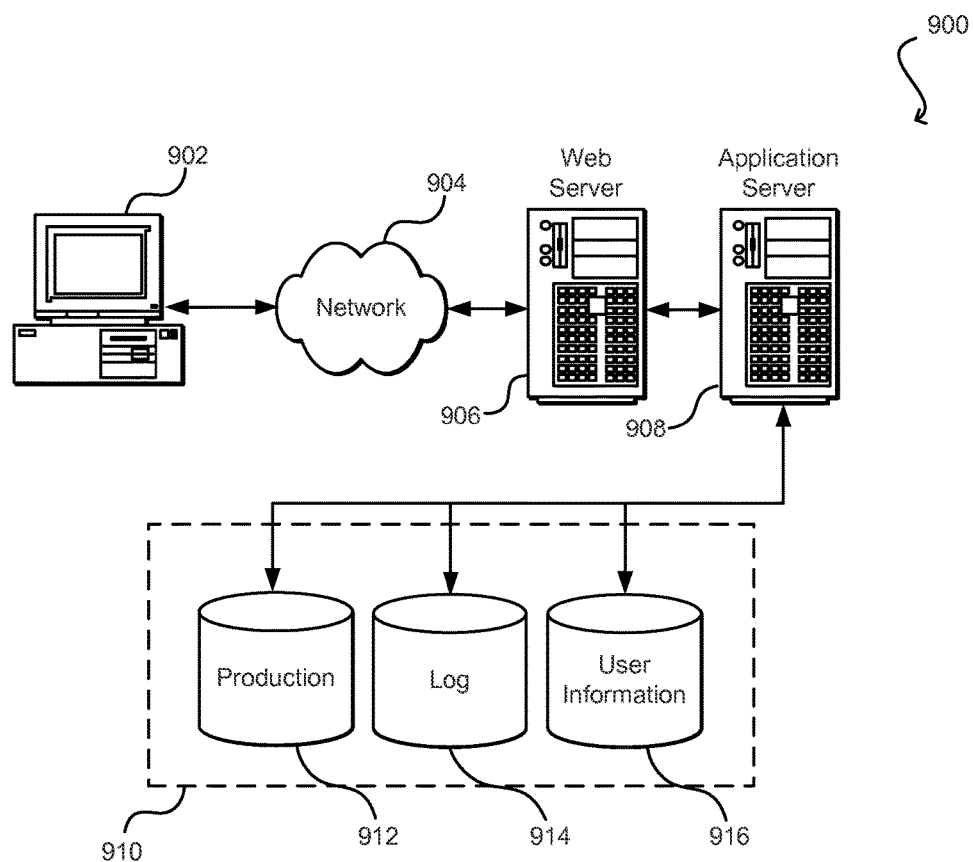
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method performed by a service provider computer, comprising:
    during a browsing session between a user computing device and an electronic marketplace, the electronic marketplace including an electronic catalog of items available through the electronic marketplace:
        displaying, via the user computing device, product information regarding a device listed in the electronic catalog and a simulation option associated with simulating an output function of the device according to a parameter associated with the device, the parameter being indicative of an output capability of the device;
        receiving, from the user computing device, an input indicating selection of the simulation option;
        retrieving the parameter associated with the device in response to receiving the input;
        adjusting a configuration variable of a virtual machine in accordance with the parameter associated with the device, wherein adjusting the configuration variable of the virtual machine configures the virtual machine to simulate the output function of the device;
        providing electronic data to the virtual machine for processing, the electronic data having at least one audio characteristic or at least one visual characteristic, the processing by the virtual machine including modifying the at least one audio characteristic or the at least one visual characteristic of the electronic data based at least in part on the configuration variable adjusted at the virtual machine; and
        presenting, via the user computing device, the electronic data as processed to simulate the output function of the device according to the parameter associated with the device.

2. The computer-implemented method of claim 1, wherein the output function corresponds to an audio output capability of the device, the parameter includes an audio output parameter, the electronic data includes audio data, and the electronic data presented comprises at least one of an audio virtualization of the audio output capability of the device, or a graphic virtualization of the audio output capability of the device.

3. The computer-implemented method of claim 1, wherein the output function corresponds to a camera capability of the device, the parameter includes an image or video capture parameter, the electronic data includes at least one of image data or video data, and presenting the electronic data comprises presenting at least one of an image capture virtualization of the camera capability of the device, or a video virtualization of the camera capability of the device.

4. The computer-implemented method of claim 1, wherein the output function corresponds to a display capability of the device, the parameter includes an image or video output parameter, the electronic data includes at least one of image data or video data, and presenting the electronic data comprises presenting at least one of an image virtualization of the display capability of the device or a video virtualization of the display capability of the device.

5. A computer-implemented method performed by a service provider computer, comprising:

displaying, via a user computing device, first product information regarding a device available from an electronic marketplace and a simulation option associated with simulating an output function of the device according to a parameter associated with the device or associated with the user computing device, the parameter being indicative of a first output capability of the device or indicative of a second output capability of the user computing device;

retrieving the parameter based at least in part on receiving input indicating selection of the simulation option;

adjusting a configuration variable of a virtual machine in accordance with the parameter associated with the device, wherein adjusting the configuration variable of the virtual machine configures the virtual machine to simulate the output function of the device;

providing electronic data to the virtual machine for processing, the electronic data having at least one audio characteristic or at least one visual characteristic, the processing by the virtual machine comprising modifying the at least one audio characteristic or the at least one visual characteristic of the electronic data based at least in part on the configuration variable adjusted at the virtual machine; and presenting, via the user computing device, the electronic data as processed to simulate the output function of the device according to the parameter associated with the device.

6. The computer-implemented method of claim 5, wherein the electronic data is at least one of provided by the electronic marketplace or associated with a user account, and includes at least one of audio data, image data, or video data.

7. The computer-implemented method of claim 5, wherein the electronic data is obtained via the user computing device and includes at least one of audio data, image data, or video data.

8. The computer-implemented method of claim 5, wherein the parameter is associated with the device and the parameter is representative of at least one of an audio output capability, an audio input capability, an image capture capability, an image display capability, a video capture capability, or a video display capability of the device.

9. The computer-implemented method of claim 5, wherein the virtual machine utilizes an algorithm with a variable value that corresponds to the configuration variable.

10. The computer-implemented method of claim 5, wherein:
the output function comprises at least one of an audio output, an audio input, an image capture, an image display, a video capture, or a video display; and
the parameter associated with the device is representative of a performance quality of the output function of the device.

11. The computer-implemented method of claim 5, further comprising:
displaying, on the user computing device, additional product information regarding an additional device and an additional simulation option associated with simulating an additional output function of the additional device;
adjusting an additional configuration variable of an additional virtual machine according to an additional parameter associated with the additional device, the additional parameter being indicative of an additional output capability of the additional device;
processing additional electronic data using the additional virtual machine, the processing of the additional electronic data including modifying at least one of an additional audio characteristic or an additional visual characteristic of the electronic data based at least in part on the additional configuration variable adjusted at the additional virtual machine; and
presenting, via the user computing device, a comparison of the electronic data processed using the virtual machine and the additional electronic data processed using the additional virtual machine.

12. The computer-implemented method of claim 11, wherein the comparison includes simultaneous presentation of the electronic data processed using the virtual machine and the electronic data processed using the additional virtual machine.

13. The computer-implemented method of claim 5, wherein a plurality of output functions are associated with the device, the method further comprising:
displaying, on the user computing device, a plurality of icons, each of said icons associated with one of the plurality of output functions;
receiving a user selection of at least one of the plurality of icons; and
adjusting one or more configuration variables of the virtual machine in accordance with the user selection of the at least one of the plurality of icons.

14. The computer-implemented method of claim 5, further comprising determining a selected format for the electronic data simulating the output function of the device from among a plurality of formats, the determination of the selected format based at least in part on one or more of:
a user selection of the selected format;
a user preference;
an output or input capability of the user computing device; or
an output or input quality of the user computing device.

15. A system, comprising:
a service provider computer, the service provider computer comprising:
a memory that stores computer-executable instructions; and
a processor configured to access the memory and execute the computer-executable instructions to collectively, cause the service provider computer to, at least:
provide an electronic marketplace including an electronic catalog of items available via the electronic marketplace;
display product information via a user computing device, the product information regarding a device that is electronically represented in the electronic catalog and a simulation option associated with simulating an output function of the device according to a parameter associated with the device, the parameter being indicative of an output capability of the device;
receive, from the user computing device, input indicating selection of the simulation option;
retrieve the parameter associated with the device in response to receiving the input;
adjust a configuration variable of a virtual machine in accordance with the parameter associated with the device, wherein adjusting the configuration variable of the virtual machine configures the virtual machine to simulate the output function of the device;

provide electronic data to the virtual machine for processing, the processing by the virtual machine including modifying at least one audio characteristic or at least one visual characteristic of the electronic data based at least in part on the configuration variable adjusted at the virtual machine; and present, via the user computing device, the electronic data as processed to simulate the output function of the device according to the parameter associated with the device.

16. The system of claim 15, wherein presenting the electronic data simulates an audio function of the device via an audio output of the user computing device, simulates the audio function of the device via a display of the user computing device, or simulates a visual function of the device via a display of the user computing device.

17. The system of claim 15, wherein the processor is configured to access the memory and execute further computer-executable instructions to collectively at least store parameters of the items available via the electronic marketplace, and wherein obtaining the parameter associated with the device includes accessing at least one of the stored parameters.

18. The system of claim 15, wherein the processor is configured to access the memory and execute further computer-executable instructions to collectively at least:
receive a modification of the configuration variable of the virtual machine;
adjust the configuration variable of the virtual machine based at least in part on the modification received;
search the electronic catalog based at least in part on the configuration variable as adjusted;
identify an additional device from the electronic catalog, the additional device being associated with an additional parameter corresponding to the configuration variable as adjusted, the additional parameter being indicative of an additional output capability of the additional device; and
present an electronic representation of the additional device via the user computing device.

* * * * *

UNITED STATES PATENT AND TRADEMARK OFFICE
CERTIFICATE OF CORRECTION

PATENT NO. : 10,296,954 B1
APPLICATION NO. : 14/660322
DATED : May 21, 2019
INVENTOR(S) : Pushpendra Narain Mishra Page 1 of 1

It is certified that error appears in the above-identified patent and that said Letters Patent is hereby corrected as shown below:

In the Claims

Column 20, Line 10, Claim 1:
Delete: "device and an electronic marketplace, the electronic"
Insert: --device and an electronic marketplace hosted by the service provider computer, the electronic--

Signed and Sealed this
Sixteenth Day of July, 2019

Andrei Iancu
*Director of the United States Patent and Trademark Office*